US009329644B2

(12) United States Patent
Wang et al.

(10) Patent No.: US 9,329,644 B2
(45) Date of Patent: May 3, 2016

(54) MOUNTING APPARATUS FOR DATA STORAGE DEVICES

(71) Applicant: ScienBiziP Consulting (Shen Zhen) Co., Ltd., Shenzhen (CN)

(72) Inventors: Liang-Chin Wang, New Taipei (TW); Yu-Ming Xiao, Wuhan (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 120 days.

(21) Appl. No.: 14/267,080

(22) Filed: May 1, 2014

(65) Prior Publication Data

US 2014/0376171 A1    Dec. 25, 2014

(30) Foreign Application Priority Data

Jun. 21, 2013  (CN) .......................... 2013 1 0246988

(51) Int. Cl.
*G06F 1/18*    (2006.01)
(52) U.S. Cl.
CPC ................ *G06F 1/187* (2013.01); *G06F 1/181* (2013.01)
(58) Field of Classification Search
CPC ............ G06F 1/18; G06F 1/181; G06F 1/187
USPC ....................... 361/679.39, 695, 725; 248/300
See application file for complete search history.

(56) References Cited

U.S. PATENT DOCUMENTS

| 6,721,177 | B1 * | 4/2004 | Wang ................... | G11B 33/128 248/638 |
| 2003/0198013 | A1 * | 10/2003 | Chen ...................... | G06F 1/187 361/679.33 |
| 2004/0125555 | A1 * | 7/2004 | Chen ...................... | G06F 1/184 361/679.33 |

* cited by examiner

*Primary Examiner* — Dion R Ferguson
*Assistant Examiner* — Mandeep S Buttar
(74) *Attorney, Agent, or Firm* — Novak Druce Connolly Bove + Quigg LLP

(57) ABSTRACT

A mounting apparatus includes a drive bracket and a securing piece. The drive bracket includes a bottom plate and a side plate. A separating plate is located on the bottom plate to divide the drive bracket into a first portion and a second portion. The first portion defines an engaging hole. The second portion defines a first slide groove. An elastic piece is mounted on the side plate. The elastic piece defines a receiving hole. The securing piece is mounted on the one data storage device. The securing piece includes a clip engaged in the engaging hole to mount the first data storage device in the first portion. A first sliding block is mounted on another data storage device. The elastic piece is elastically bent to allow the first sliding block to slide in the first slide groove, and the first sliding block is engaged in the receiving hole.

13 Claims, 4 Drawing Sheets

MOUNTING APPARATUS FOR DATA STORAGE DEVICES

CROSS-REFERENCE TO RELATED APPLICATIONS

This application claims all benefits accruing under 35 U.S.C. §119 from China Patent Application No. 201310246988.5, filed on Jun. 21, 2013 in the China Intellectual Property Office. The contents of the China Application are hereby incorporated by reference.

FIELD

The disclosure generally relates to mounting apparatuses for mounting data storage devices, and more specifically to a mounting apparatus for mounting different data storage devices of different sizes.

BACKGROUND

Data storage devices, such as floppy disk drives or hard disk drives, are usually installed in a computer enclosure. Data storage device carriers are used to securely hold the storage devices and ensure that they run smoothly. The data storage device carriers holding the data storage devices should take up as little space as possible to help keep an entire computer compact.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
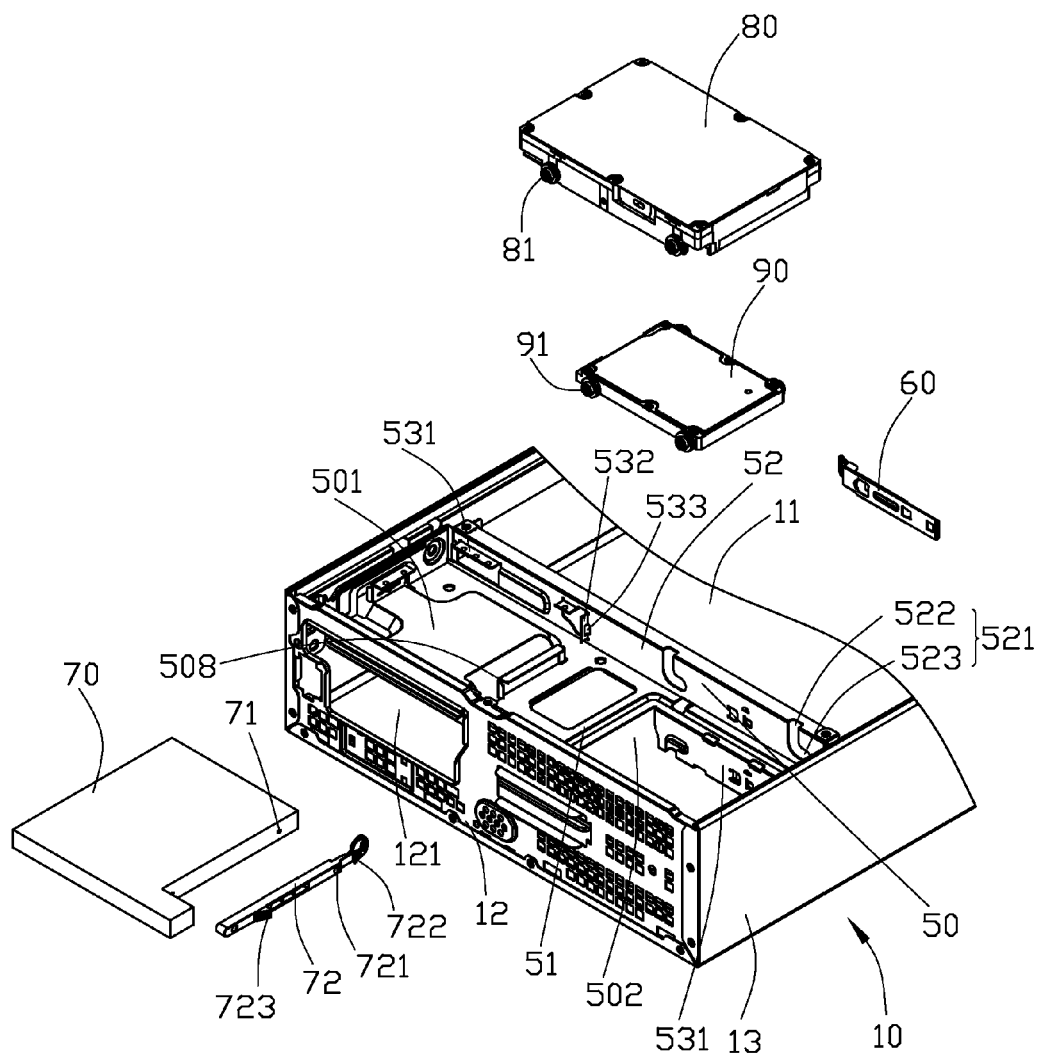
FIG. 1 is an isometric, exploded view of an embodiment of a mounting apparatus for mounting a first data storage device, a second data storage device, and a third data storage device which have different sizes.

The disclosure is illustrated by way of example and not by way of limitation in the figures of the accompanying drawings in which like reference numerals indicate similar elements. It should be noted that references to "an" or "one" embodiment in this disclosure are not necessarily to the same embodiment, and such references mean "at least one."

Figure 2:
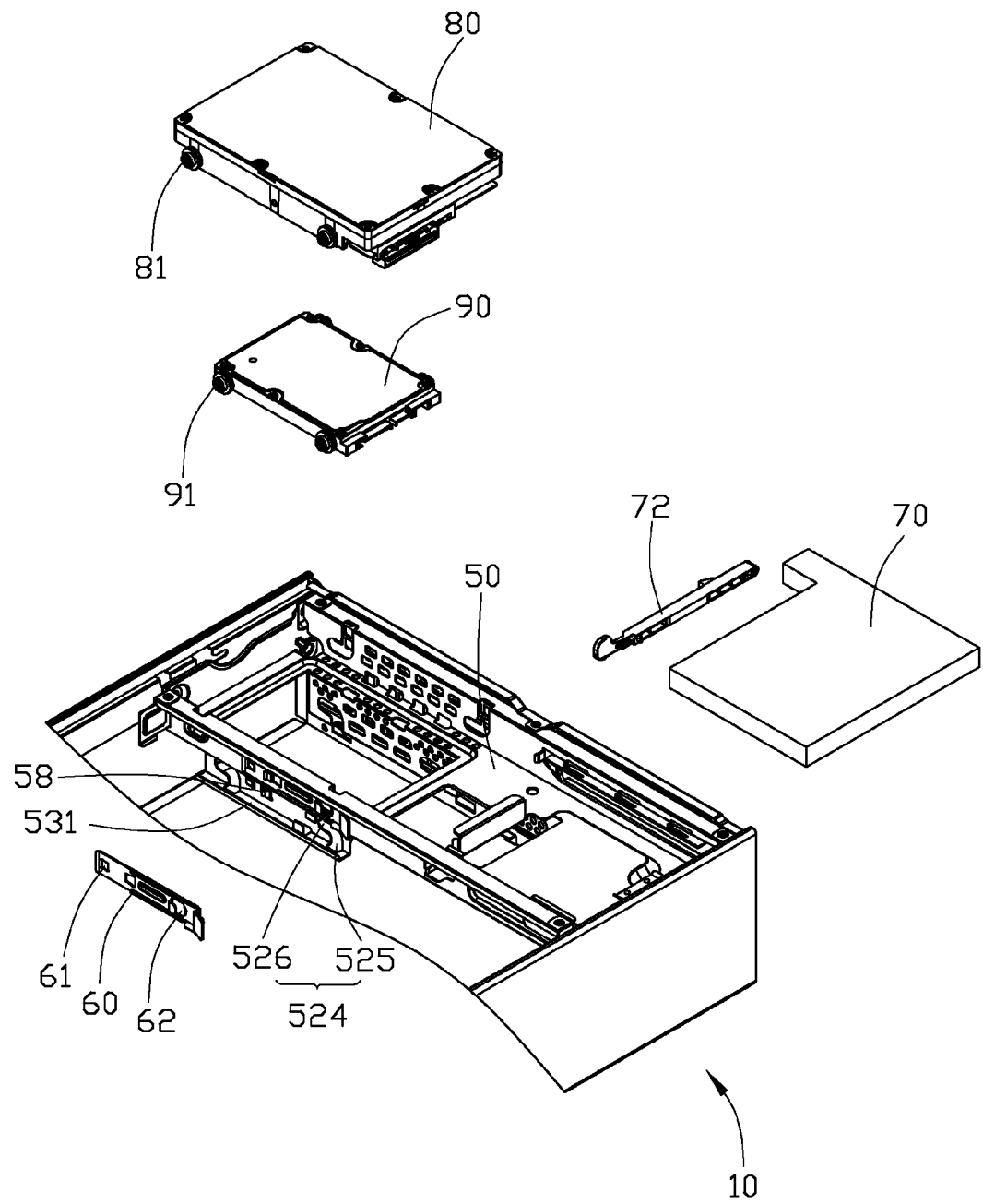
FIG. 2 is similar to FIG. 1, but viewed from another aspect.
Figure 3:
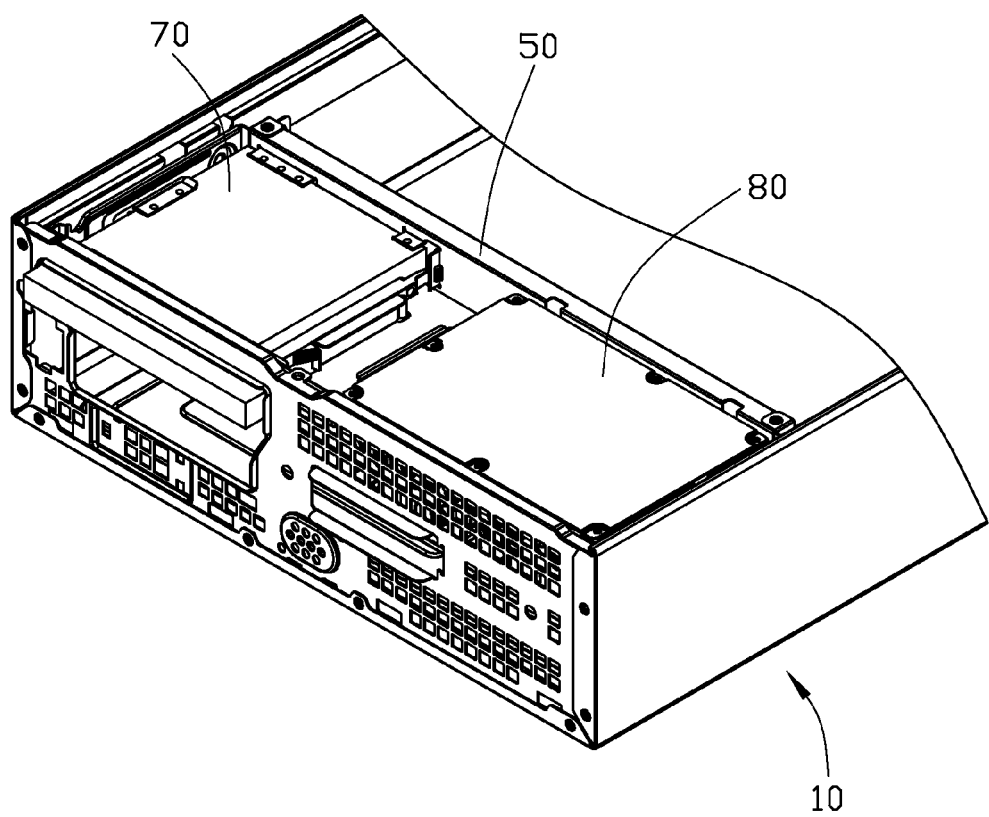
FIG. 3 is an isometric, assembled view of the mounting apparatus of FIG. 1.
Figure 4:
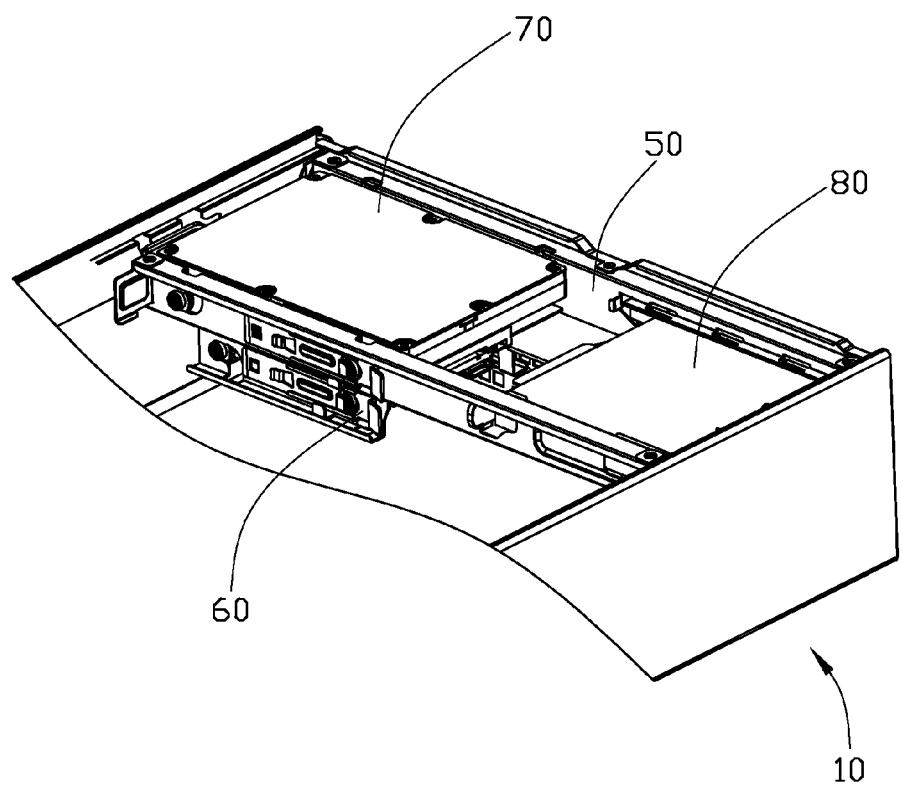
FIG. 4 is another isometric, assembled view of the mounting apparatus of FIG. 1.

FIGS. 1 and 2 illustrate one embodiment of a mounting apparatus for mounting a first data storage device 70, a second data storage device 80, and a third data storage device 90. The mounting apparatus includes a case 10 and a data storage device 50 mounted in the case 10.

The case 10 includes a bottom wall 11, a front wall 12 perpendicularly connected to a front edge of the bottom wall 11, a pair of side walls 13 perpendicularly connected to a left edge and a right edge of the bottom wall 11. The front wall 12 is connected between the pair of side walls 13. An opening 121 is defined in the front wall 12.

A drive bracket 50 is mounted between the pair of side walls 13 and abuts the front wall 12. The drive bracket 50 includes a bottom plate 51 and a pair of side plates 52 connected to opposite edges of the bottom plate 51. A separating plate 508 is located on the bottom plate 51 to divide the drive bracket 50 into a first portion 501 and a second portion 502. The first portion 501 is aligned with the opening 121. The side plate 52 includes a restricting piece 531 and a mounting piece 532. The restricting piece 531 and the mounting piece 532 are located in the first portion 501. The mounting piece 532 defines a mounting hole 533. The side plate 52 defines a first slide groove 521, which is located in the second portion 502. The first slide groove 521 is an "L" shape and includes a first guiding portion 522 and a first restricting portion 523 perpendicularly connected to the first guiding portion 522. The first guiding portion 522 is located above the first restricting portion 523. The first guiding portion 522 extends through a top edge of the side plate 52.

The second portion 502 extends downward to form a pair of extending pieces 538. A distance between the pair of extending pieces 538 is smaller than that between the pair of side plates 52. Each extending piece 538 defines a second slide groove 524. The second slide groove 524 is an "L" shape and includes a second guiding portion 525 and a second restricting portion 526 perpendicularly connected to the second guiding portion 525. The second guiding portion 525 is located below the second restricting portion 526. The second guiding portion 525 extends through a bottom edge of the extending piece 538.

One of the side plates 52 located away from the front wall 12, includes a clasp 58. One of the extending pieces 538 located away from the front wall 12, includes another clasp 58. A pair of elastic pieces 60 can be mounted on the plate 52 and the extending piece 538. Each elastic piece 60 defines an engaging hole 61 and a receiving hole 62.

One side of the first data storage device 70 defines two securing holes 71. A securing piece 72 can be mounted on the data storage device 70. The securing piece 72 defines two through holes 72 corresponding to the two securing holes 71. The securing piece 72 includes a clip 722 and a blocking piece 723.

A width of the second data storage device 80 is larger than that of the third data storage device 90. The second data storage device 80 includes a pair of first sliding blocks 81. The third data storage device 90 includes a pair of second sliding blocks 91.

FIGS. 1 to 4 illustrate that, in assembly, the though holes 721 of the securing piece 72 are aligned to the securing holes 71 of the first data storage device 70. Two fasteners are mounted in the through holes 721 and the securing holes 71 to mount the securing piece 72 on the first data storage device 70. The first data storage device 70 is moved in the first portion 501 of the drive bracket 50 via the opening 121. The clip 722 of the securing piece 72 abuts the mounting piece 532 and is bent by the mounting piece 532. The first data storage device 70 is further moved to align the clip 722 with the mounting hole 533. The clip 722 rebounds to be engaged in the mounting hole 533. Simultaneously, the restricting pieces 531 restrict a top portion of the first data storage device 70. Thereby, the first data storage device 70 is mounted in the first portion 501 of the drive bracket 50. At this position, the blocking piece 723 of the securing piece 72 abuts the separating plate 508 of the drive bracket 50.

Then, the clasps 58 are inserted in the engaging holes 61 of elastic pieces 60 to mount the two elastic pieces 60 on the side plates 52 and the extending piece 538. One receiving hole 62 of one elastic piece 60 is aligned to the first restricting portion 523, and another receiving hole 62 of another elastic piece 60 is aligned to the second restricting portion 526.

The first sliding block 81 of the second data storage device 80 slides in the first slide groove 521. The elastic piece 60 is elastically bent to allow the first sliding block 81 to slide in the first restricting portion 523 until the first sliding block 81 is aligned to the receiving hole 62. The elastic piece 60 is then released to mount the first sliding block 81 in the receiving hole 62. Thereby, the second data storage device 80 is mounted on the drive bracket 50.

The second sliding block 91 of the third data storage device 90 slides in the second slide groove 524. The corresponding elastic piece 60 is elastically bent to allow the second sliding block 91 to slide in the second restricting portion 527 until the first sliding block 81 is aligned to the corresponding receiving hole 62. The corresponding elastic piece 60 is then released to mount the second sliding block 91 in the receiving hole 62. Thereby, the third data storage device 90 is mounted on the drive bracket 50.

The above data storage apparatus can receive different data storage devices of different sizes.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mounting apparatus for mounting a first data storage device and a second data storage device, the mounting apparatus comprising:
   a drive bracket comprising a bottom plate and a side plate;
   a separating plate located on the bottom plate to divide the drive bracket into a first portion and a second portion, the first portion defining an engaging hole, the second portion defining a first slide groove;
   an elastic piece mounted on the side plate, the elastic piece defining a receiving hole;
   a securing piece mounted on the first data storage device, the securing piece comprising a clip engaged in the engaging hole to mount the first data storage device in the first portion; and
   a first sliding block mounted on the second data storage device; the elastic piece is elastically bent to allow the first sliding block to slide in the first slide groove, and the first sliding block is engaged in the receiving hole to mount the second data storage device in the second portion.

2. The mounting apparatus of claim 1, wherein the side plate comprises a restricting piece, and the restricting piece is configured to restrict a top portion of the first data storage device.

3. The mounting apparatus of claim 2, wherein the securing piece comprises a blocking piece, and the blocking piece abuts the separating plate.

4. The mounting apparatus of claim 1, wherein the first slide groove comprises a first guiding portion and a first restricting portion perpendicularly connected to the first guiding portion, the first guiding portion is located above the first restricting portion, and the first guiding portion extends through a top edge of the side plate.

5. The mounting apparatus of claim 4, wherein the receiving hole is aligned to the first restricting portion.

6. The mounting apparatus of claim 1, wherein the side plate comprises an extending piece, the extending piece defines a second slide groove, another elastic piece is mounted on the extending piece, and the another elastic piece is configured to be bent to allow the second sliding block to slide in the second slide groove.

7. The mounting apparatus of claim 6, wherein the second slide groove comprises a second guiding portion and a second restricting portion perpendicularly connected to the second guiding portion, the second guiding portion is located below the second restricting portion, and the second guiding portion extends through a bottom edge of the extending piece.

8. The mounting apparatus of claim 1, further comprising a case to mount the drive bracket therein, wherein the case defines an opening aligned to first portion.

9. An assembly, comprising:
   a first data storage device, a second data storage device comprising a first sliding block, and a third data storage device comprising a second sliding block; and
   a drive bracket comprising a bottom plate and a first side plate, a separating plate located on the bottom plate to divide the drive bracket into a first portion and a second portion, the first side plate defining a first slid groove which is located in the second portion, the second portion comprising an extending piece, the extending piece defining a second slide groove, and the extending piece and the first side plate located on opposite sides of the bottom plate;
   wherein the first data storage device is mounted in the first portion, the first sliding block is engaged in the first slide groove to mount the second data storage device on one side of the second portion, and the second sliding block is engaged in the second slide groove to mount the third data storage device on another side of the second portion.

10. The mounting apparatus of claim 9, wherein the first slide groove comprises a first guiding portion and a first restricting portion perpendicularly connected to the first guiding portion, the first guiding portion is located above the first restricting portion, and the first guiding portion extends through a top edge of the side plate.

11. The mounting apparatus of claim 10, wherein an elastic piece is mounted on the side plate, the elastic piece defines a receiving hole aligned to the first restricting portion, and the elastic piece is configured to be bent to allow the first sliding block to slide in the first slide groove, and the first sliding block is engaged in the receiving hole.

12. The mounting apparatus of claim 9, wherein the second slide groove comprises a second guiding portion and a second restricting portion perpendicularly connected to the second guiding portion, the second guiding portion is located below the second restricting portion, and the second guiding portion extends through a bottom edge of the extending piece.

13. The mounting apparatus of claim 12, wherein an elastic piece is mounted on the extending piece, the elastic piece defines a receiving hole aligned to the second restricting portion, and the elastic piece is configured to be bent to allow the second sliding block to slide in the second slide groove, and the second sliding block is engaged in the receiving hole.

\* \* \* \* \*